US012670076B2

(12) United States Patent
McDowell et al.

(10) Patent No.: US 12,670,076 B2
(45) Date of Patent: Jun. 30, 2026

(54) PROVISION AND CONFIGURATION OF QUORUM WITNESSES IN CLUSTERS

(71) Applicant: NEBULON, INC., Fremont, CA (US)

(72) Inventors: Jonathan A. McDowell, Belfast (GB); Simon Hewitt, Craigavon (GB)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/708,066

(22) PCT Filed: Dec. 7, 2022

(86) PCT No.: PCT/US2022/052179
§ 371 (c)(1),
(2) Date: May 7, 2024

(87) PCT Pub. No.: WO2023/107581
PCT Pub. Date: Jun. 15, 2023

(65) Prior Publication Data
US 2025/0021451 A1 Jan. 16, 2025

Related U.S. Application Data

(60) Provisional application No. 63/286,708, filed on Dec. 7, 2021.

(51) Int. Cl.
*G06F 11/20* (2006.01)
*G06F 11/07* (2006.01)
*H04L 67/1097* (2022.01)

(52) U.S. Cl.
CPC ...... *G06F 11/2023* (2013.01); *G06F 11/0709* (2013.01); *G06F 11/2056* (2013.01); *H04L 67/1097* (2013.01)

(58) Field of Classification Search
CPC . G06F 11/079; G06F 11/2023; G06F 11/2056
See application file for complete search history.

(56) References Cited

U.S. PATENT DOCUMENTS

| | | | |
|---|---|---|---|
| 2009/0113034 A1 | 4/2009 | Krishnappa et al. | |
| 2015/0046610 A1 | 2/2015 | Aster | |
| 2015/0169415 A1 | 6/2015 | Hildebrand et al. | |
| 2017/0318092 A1 | 11/2017 | Maredia et al. | |
| 2019/0188406 A1* | 6/2019 | McKelvie ........... | G06F 21/6218 |

(Continued)

OTHER PUBLICATIONS

International Search Report and Written Opinion issued in PCT Application No. PCT/US22/52179, dated Mar. 8, 2023.

(Continued)

*Primary Examiner* — Michael Maskulinski
(74) *Attorney, Agent, or Firm* — Hogan Lovells US LLP

(57) ABSTRACT

A cloud managed storage system (200) includes a cluster of the nodes (220) that are already in communication with a cloud management plane (280) that has visibility of all the storage nodes (220) in the cluster. When a cluster is created, the number of nodes (220) is determined and based on the number of nodes (220), the storage system (200) can determine whether an external quorum witness (284) is required and automatically enable a quorum witness (284) as a cloud service. Storage nodes (220) can contact the quorum witness (284) when necessary for failover processes.

20 Claims, 3 Drawing Sheets

(56)         References Cited

U.S. PATENT DOCUMENTS

| 2020/0026625 A1 | 1/2020 | Konka |
| 2020/0042410 A1 | 2/2020 | Gupta |
| 2020/0045139 A1 | 2/2020 | Gupta et al. |
| 2020/0112499 A1 | 4/2020 | Casacio et al. |
| 2024/0097965 A1* | 3/2024 | Behere ............... H04L 67/1034 |

OTHER PUBLICATIONS

Extended European Search Report issued in EP Application No. 22905093.5. dated Oct. 13, 2025.

* cited by examiner

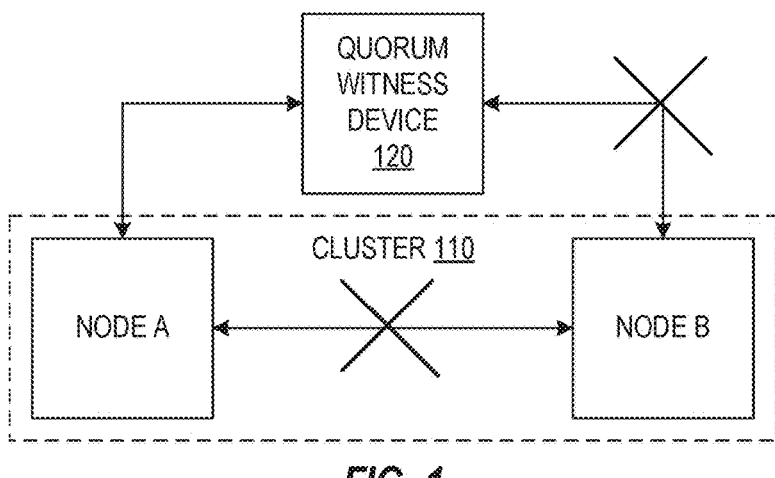

FIG. 1

STORAGE PLATFORMS AT OTHER FACILITIES 290

EXTERNAL CLIENT(S) 272

PUBLIC NETWORK 270

MANAGEMENT INFRASTRUCTURE 280

STORAGE ADMINISTRATION 282

QUORUM WITNESS 284

246

ENTERPRISE FACILITIES 240

CLIENT STATION 242

NETWORK 244

CLIENT STATION 242

STORAGE PLATFORM 200

HOST SERVER 210-1

HOST SERVER 210-n 248    248

SERVICE PROCESSING UNIT 220-1

PROCESSING 250

MANAGEMENT ADDRESS 252

228

227

228

227

SERVICE PROCESSING UNIT 220-m

PROCESSING 250

MANAGEMENT ADDRESS 252

222a  222b  222c  222d 224w  224x  226

260

222w  222x  222y  222z 224a  224b  226

BACKEND STORAGE 230-1

BACKEND STORAGE 230-m

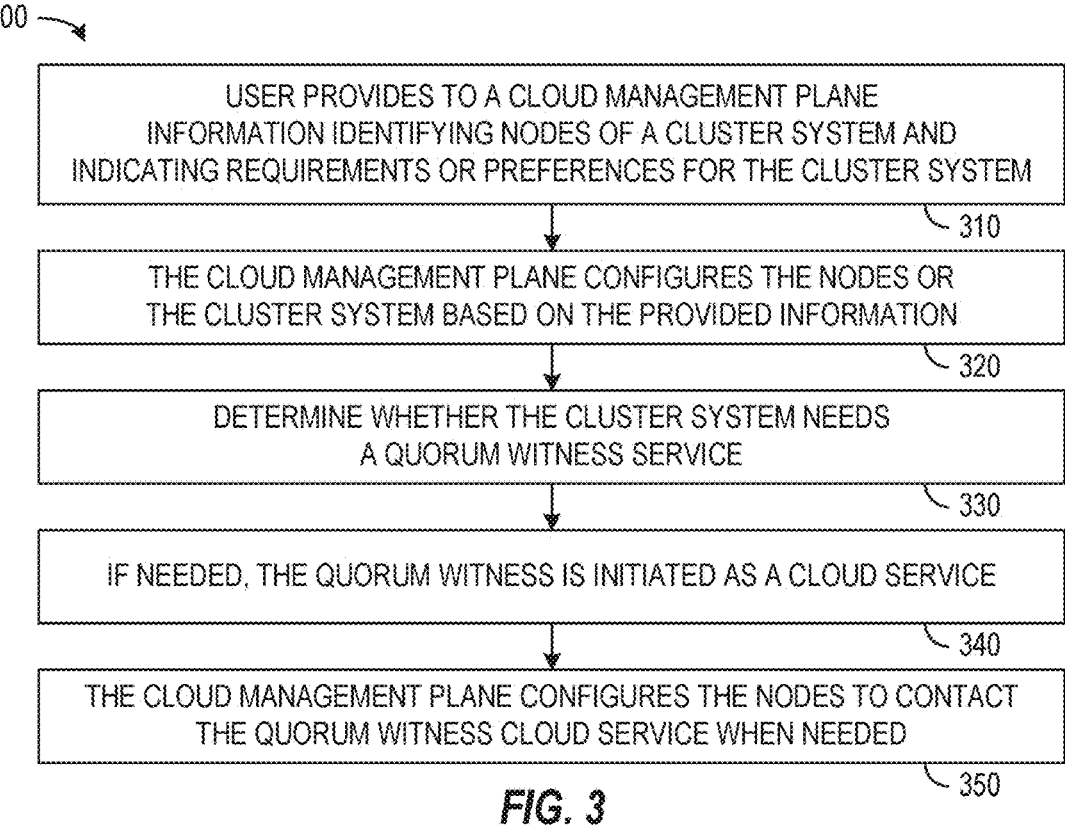

USER PROVIDES TO A CLOUD MANAGEMENT PLANE
INFORMATION IDENTIFYING NODES OF A CLUSTER SYSTEM AND
INDICATING REQUIREMENTS OR PREFERENCES FOR THE CLUSTER SYSTEM
⟍ 310

THE CLOUD MANAGEMENT PLANE CONFIGURES THE NODES OR
THE CLUSTER SYSTEM BASED ON THE PROVIDED INFORMATION
⟍ 320

DETERMINE WHETHER THE CLUSTER SYSTEM NEEDS
A QUORUM WITNESS SERVICE
⟍ 330

IF NEEDED, THE QUORUM WITNESS IS INITIATED AS A CLOUD SERVICE
⟍ 340

THE CLOUD MANAGEMENT PLANE CONFIGURES THE NODES TO CONTACT
THE QUORUM WITNESS CLOUD SERVICE WHEN NEEDED
⟍ 350

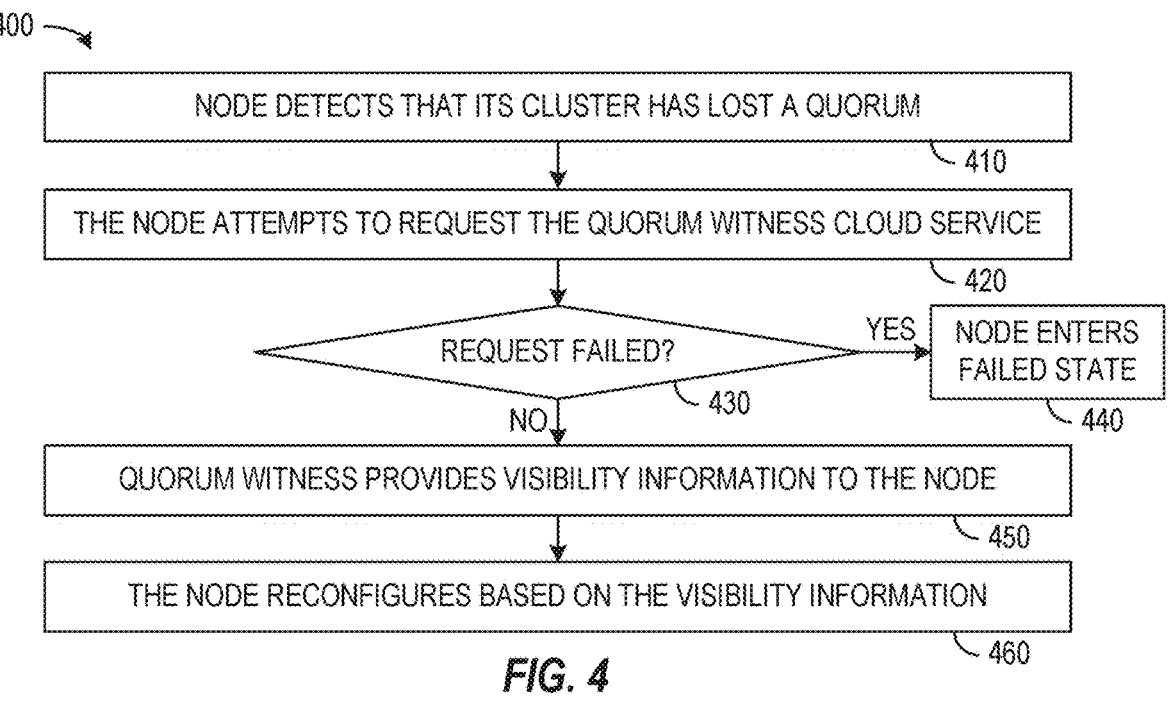

NODE DETECTS THAT ITS CLUSTER HAS LOST A QUORUM
⟍ 410

THE NODE ATTEMPTS TO REQUEST THE QUORUM WITNESS CLOUD SERVICE
⟍ 420

REQUEST FAILED?     YES → NODE ENTERS FAILED STATE
⟍ 430       ⟍ 440

NO ↓

QUORUM WITNESS PROVIDES VISIBILITY INFORMATION TO THE NODE
⟍ 450

THE NODE RECONFIGURES BASED ON THE VISIBILITY INFORMATION
⟍ 460

*FIG. 4*

PROVISION AND CONFIGURATION OF QUORUM WITNESSES IN CLUSTERS

CROSS-REFERENCES TO RELATED APPLICATIONS

This application is a United States National Stage Application, pursuant to 35 U.S.C. § 371, of PCT Patent Application No. PCT/US2022/052179, filed on Dec. 7, 2022, titled PROVISION AND CONFIGURATION OF QUORUM WITNESSES IN CLUSTERS, which is related to and claims the benefit of priority from U.S. Provisional Application No. 63/286,708, filed on Dec. 7, 2021, also titled PROVISION AND CONFIGURATION OF QUORUM WITNESSES IN CLUSTERS, the entire disclosures of both of which are hereby incorporated by reference herein for all intents and purposes.

BACKGROUND

Clustered systems include multiple independent nodes that operate semi-autonomously while being capable of taking over operation for other nodes. The take-over ability of a node in a clustered system is generally dependent on the cluster having "quorum." A cluster is quorate if more than half of the cluster is available. For example, if a node can see, e.g., successfully communicate with, strictly more than half of the available other nodes, that node knows it is part of a quorate cluster and can continue to operate normally. If a node is separated from the rest of the cluster, that node becomes aware that it is no longer part of the quorum and may therefore cease operation, and another node that is still part of the quorum cluster can take over operations of the node that ceased operation. The act of taking over for a failed node is sometimes referred to as failover.

A single node failure in a cluster with three or more nodes still leaves at least two nodes available in the cluster, so failover from the failed node to the remaining two nodes can happen naturally. If, however, a cluster consists of only two nodes then an isolated node may not be able to distinguish between having been isolated or the other node failing. A common solution for two-node clusters is addition of a "quorum witness" device that can normally communicate with both nodes. FIG. 1 illustrates a two-node cluster 110 having nodes A in B that lost contact with each other, i.e., each node A or B is unable to receive communications from the other node B or A. Nodes A and B can then query a quorum witness device 120. In the example of FIG. 1, node A can reach the quorum witness 120, and node A and quorum witness device 120 determine that the other node B is no longer available and that node A should take over the functions of node B. Node B ceases operations when the query to quorum witness device 120 fails.

Traditional two-node cluster solutions require manual installation of a quorum witness device in a manner such that the quorum witness device is network accessible to the nodes within the cluster. The nodes in the cluster additionally need to be configured to be aware of the location of the quorum witness.

BRIEF DESCRIPTION OF THE DRAWINGS

FIG. 1 is a block diagram of a conventional cluster architecture including two nodes and a quorum witness device.

FIG. 2 is a block diagram illustrating a cluster storage architecture including a multi-node storage platform having cloud-based management that can configure storage nodes and act as a quorum witness in accordance with one example of the present disclosure.

FIG. 3 is a flow diagram of a process for setup of a storage platform using a cloud-based quorum witness service in accordance with an example of the present disclosure.

FIG. 4 is a flow diagram of a process executed by a node that loses contact with a quorum of nodes in a cluster in accordance with an example of the present disclosure.

FIGS. 5-1 and 5-2 represent a two-node cluster system in alternative failure states in which the process of FIG. 4 may be applied.

The drawings illustrate examples for the purpose of explanation and are not of the invention itself. Use of the same reference symbols in different figures indicates similar or identical items.

DETAILED DESCRIPTION

In accordance with an aspect of the invention, quorum witness capabilities are streamlined in a cloud managed storage system. A cloud-managed storage system includes a cluster of the nodes in communication with a cloud-based management plane. The cloud-based management plane has full visibility of all storage nodes during normal operation of the cluster. When a cluster is created, the cloud-managed storage system can determine whether an external quorum witness is required, e.g., based on the number of nodes in the cluster, and can automatically enable the extra quorum witness functionality in the cloud management plane. This technique avoids both the need for installation any quorum witness device and the need to provide any additional configuration details that identify a quorum witness device for the nodes forming the cluster. An enterprise employing the cloud-managed storage system may thus avoid the costs needed to install and maintain a separate quorum witness device in addition to the nodes in the cluster, and the enterprise avoids the installation complexity needed for additional quorum witness configuration since each node that is already configurated to communicate with the cloud-based management for management can also communicate with the cloud-based management for quorum services.

A cloud-based management plane that is part of smart infrastructure can provide the quorum witness functionality invisibly to the end user. As any cluster being setup is configured via this cloud-based management plane, the cloud-base management plane (or each node individually) can determine whether a quorum witness is required, particularly in the case if a two-node cluster, and the cloud-based quorum witness can be utilized without any requirement for explicit configuration or additional hardware. In contrast, some prior cluster architectures required a manual setup or installation of a quorum witness device and then explicit configuration within the cluster of the location of the quorum witness device. As disclosed herein, a cluster system can avoid the need for any extra work on the part of the user when a cluster is created that would require a quorum witness for automatic failover determination.

Systems and processes as described herein can enhance the functionality and case of use of a storage product enabling the creation of smaller clusters (minimum size two instead of three) increasing attractiveness of the storage product to users/enterprises that may, for example, want many small-scale deployments of cluster systems at branch offices rather than concentrating on a single large datacenter deployment. By using the automatic quorum witness functionality, users can easily ensure that each small-scale deployment is still capable of the highly resilient operation that a larger cluster provides, without the need for additional equipment expenditures, i.e., for quorum witness hardware or additional nodes.

Figures 1, 5:
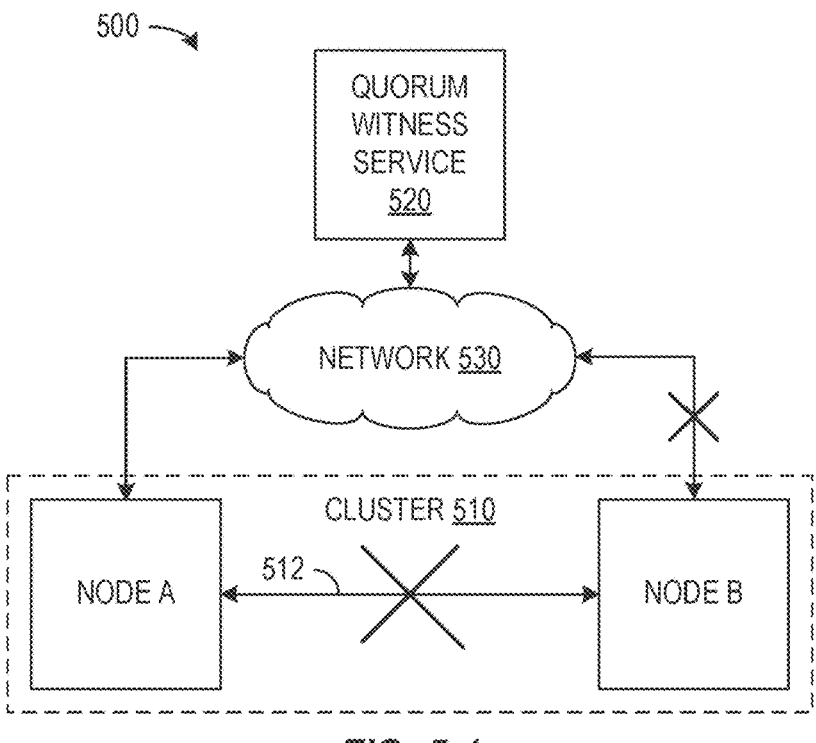
Figures 2, 5:
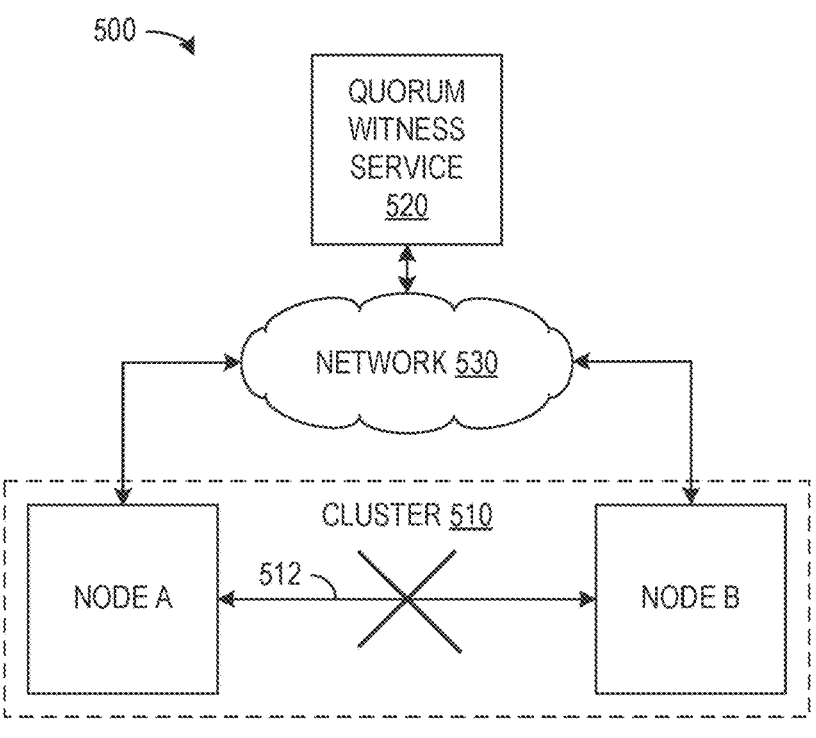

FIG. 2 is a block diagram of a system in accordance with an example of the present disclosure including a cluster storage platform 200. A user, e.g., an enterprise, may employ storage platform 200 at facilities 240 that is under the user's control. Facilities 240 generally include user hardware including the hardware implementing storage platform 200. In the example shown, storage platform 200 including two or more host servers 210-1 to 210-$n$, which are generically referred to herein as host server(s) 210. Each host server 210 may be a conventional computer or other computing system including a central processing unit (CPU), memory, and interfaces for connections to internal or external devices. One or more service processing units (SPUs) 220-1 to 220-$m$, which are generically referred to herein as SPU(s) 220, are installed in each of the host servers 210. In general, storage platform 200 may include two or more host servers 210, with each server 210 hosting one or more SPUs 220. For redundancy, storage platform 200 includes at least two host servers 210 and at least at least two SPUs 220. In general, storage platform 200 is scalable by adding more hosts 210 and SPUs 220 with associated backend storage.

Each SPU 220 may provide storage services via virtual volumes or LUNs 222, which may be available to host servers 210, client stations 242, or one or more external clients 272. FIG. 2 particularly shows SPU 220-1 provides storage services relating to a set of virtual volumes 222$a$ to 222$b$ and 222$c$ to 222$d$ and shows SPU 220-$m$ provides storage services relating to virtual volumes 222$w$ to 222$x$ and 222$y$ to 222$z$. SPU 220-1 is sometimes referred to as "owning" volumes 222$a$ to 222$b$ and 222$c$ to 222$d$ in that SPU 220-1 is normally responsible for fulfilling IO requests that are directed at any of volumes 222$a$ to 222$b$ and 222$c$ to 222$d$. Similarly, SPU 220-$m$ owns volumes 222-$w$ to 222-$x$ and 222$y$ to 222$z$ in that SPU 220-$m$ is normally responsible for executing IO requests that are directed at any of volumes 222-$w$ to 222-$x$ and 222$y$ to 222$z$. The virtual volumes, e.g., volumes 222$a$ to 222$b$, 222$c$ to 222$d$, 222$w$ to 222$x$, and 222$y$ to 222$z$, in FIG. 2 are generically referred to herein as virtual volume(s) 222. Each volume 222 may be a "mirrored" volume with each mirrored volume having a backup volume 224 kept somewhere in storage platform 200. In FIG. 2, SPU 220-1 maintains backup volumes 224$w$ to 224$x$ that copy mirrored volumes 222$y$ to 222$z$ that SPU 220-$m$ owns, and SPU 220-$m$ maintains backup volumes 224$a$ to 224$b$ that copy virtual volumes 222$a$ to 222$b$ that SPU 220-1 owns. One or more backup volumes 224$a$ to 224$b$ and 224$w$ to 224$x$ of FIG. 2 are generically referred to herein as backup volume(s) 224. Backup volumes 224 may be virtual volumes that are copies of respective primary volumes 222. Volumes 222$c$ to 222$d$ and 222$y$ to 222$z$ are "unmirrored," meaning volumes 222$c$ to 222$d$ and 222$y$ to 222$z$ do not have associated backup volumes. SPUs 220 may also maintain zero, one, or more volumes 226 that are only used by their respective host servers 210, e.g., boot LUNs.

Each SPU 220 controls associated backend storage 230, e.g., storage 230-1 to 230-$m$ associated with SPUs 220-1 to 220-$m$, for storage of data corresponding to virtual volumes 222 that the SPU 220 owns and for backup volumes 224 and unshared volume 226 that the SPU 220 maintains. In the example of FIG. 2, SPUs 220-1 operates storage 230-1 to store the data of primary volumes 222$a$ to 222$b$ and 222$c$ to 222$d$, backup volumes 224$w$ to 224$x$, and any unshared volumes 226. SPUs 220-$m$ operates storage 230-$m$ to store the data of primary volumes 222$w$ to 222$x$ and 222$y$ to 222$z$, backup volumes 224$a$ to 224$b$, and any unshared volumes 226.

Storage 230 may be installed in the same host server 210 as an associated SPU 220 or may include one or more external storage devices directly connected to its associate SPU 220 or host 210. Storage 230 may employ, for example, hard disk drives, solid state drives, or other nonvolatile storage devices or media in which data may be physically stored, and storage 230 particularly may have a redundant array of independent disks (RAID) 5 or 6 configuration for performance and redundancy.

Each SPU 220 may be installed and fully resident in the chassis of its associated host server 210. Each SPU 220 may, for example, be implemented with a card, e.g., a PCI-e card, or printed circuit board with a connector or contacts that plug into a slot in a standard peripheral interface, e.g., a PCI bus in host server 210. In the illustrated example, each SPU 220 includes a processing system 250, which may include a microprocessor, memory, an interface circuit for its host 210, an interface circuit for its backend storage 230, a communication interface 227 for communications with other SPUs 220, and a communication interface 228 for communications with networked devices.

Multiple SPUs 220, e.g., SPU 220-1 to 220-$m$ in FIG. 2, are connected using their data communication interfaces 227 and high-speed data links 260, e.g., one or more parallel, 25, 50, 100 or more GB/s Ethernet links, that interconnect the cluster or pod of SPUs 220 in storage platform 200. Data links 260 may particularly form a high-speed data network that directly interconnects the SPUs 220 in a pod or cluster and that is independent of a network 244 connecting host servers 210 and client stations 242 at enterprise facilities 240.

Each SPU 220 may further employ its network communication interface 228 and a network link 248 to connect to network 244, e.g., a local or private network of the user/enterprise, and through network 244 and a firewall 246 connect to a public or wide area network 270, e.g., the Internet. In some implementations of storage platform 200, client stations 242 may communicate with a host server 210 to request storage services. Each client station 242 may be a computer including a processor, memory, and software or firmware for executing a user interface adapted to communicate over network 244. Client stations 242 in general may be storage clients that require storage services that storage platform 200 provides. FIG. 2 further shows that network 244 may provide a connection through firewall 246 to network 270, e.g., the Internet, so that SPUs 220 may communicate with cloud-based management infrastructure 280, e.g., a cloud-based management plane for managing storage platform 200.

Conventional cluster storage systems generally require a human storage administrator whose job includes creating and managing the storage system to allocate virtual volumes and if necessary, to maintain a quorum witness device and configure storage nodes to contact the quorum witness device for failover procedures. In contrast, management infrastructure 280 in FIG. 2 includes a storage administration module 282 and a quorum witness module 284 that provide cloud-based services to automate storage administration and quorum witness tasks. Cloud-based management infrastructure 280 may include one or more computers or servers that may be located remotely from storage platform 200 and may be operated by an organization other than the enterprise or end user of storage platform 200. For example, management infrastructure 280 may be provided by the manufacturer or seller of SPUs 220 to reduce the burden of storage management on a user/enterprise that operates storage platform 200 or to offload the burden of storage management from the user/enterprise to experts or automated processes.

Management infrastructure 280 in the example of FIG. 2 includes a storage administration module 282 that may be used to manage SPUs 220, e.g., to configure SPUs 220, monitor performance of storage platform 200, or provide analysis services for storage platform 200. (Management infrastructure 280 may separately provide the same or similar service for many other storage platforms 290 at other facilities that may be controlled by the same or other users or enterprises.) Storage administration module 282, for example, may communicate through public network 270 and enterprise network 244 to contact and configure each SPU 220 to create virtual volumes 222 that the SPUs 220 own or to populate the content of virtual volumes, e.g., boot volumes or other unshared volumes 226. In some examples of the present disclosure, management infrastructure 280 can automate administration processes that define all necessary information and processes in storage platform 200 to control how SPUs 220 are clustered in storage platform 200, optimize volume placement of volumes according to user selected needs and storage architecture, e.g., a shared-nothing, shared, or shared everything storage architecture, optimize volume properties for the user/enterprise, and optimize volume presentation to servers, considering operating systems of the servers and application requirements. This enables non-storage experts to simply identify hardware or operating system information of storage platform 200, identify applications that need to access storage platform 200, or otherwise identify the storage needs or goals for storage platform 200, and storage administration module 292 can provision storage platform 200 with optimal storage configuration for the operating system and applications based on centrally defined policies.

Storage administration module 282 may employ templates, which may be selected for or by a user, and that define and control the configuration properties of storage platforms and cover any or all aspects of storage volumes in an application cluster, including but not limited to: creation and presentation of unique boot devices (e.g., boot volumes with: operating system specific volume capacity) to individual servers in an application cluster; automatic provisioning of an operating system from a predefined image sourced from a URL (see International Pub. No. WO 2021/174070, entitled "Automatic Population of Boot Volumes via Provided URLs); and setting of system-specific data protection policies, including but not limited to snapshots and mirroring. Storage administration module 282 can control creation and presentation of application-optimized data volumes to servers 210 in storage platform 200. Some aspects that may be optimized or controlled include: volume properties that will yield the best performance and storage reliability for one or more particular applications on storage platform 200; volume sizes, characteristics, and quantities that are tailored to applications with the given hardware configurations of servers 210, including but not limited to physical drives of backend storage 230 and the CPUs and memory in servers 210; application-specific data protection settings on volumes 222 used by the applications, including but not limited to protection against drive failure in backend storage 230, failure of one or more servers 210, failure of one or more SPU 220, and other failures of user facilities 240; and application-specific presentation of volumes to the appropriate servers 210 in cluster storage platform 200.

Quorum witness module 284 of management infrastructure 280 may provide a quorum witness service, and management infrastructure 280, e.g., storage administration module 282, may configure each SPU 220 to use a specified management address to contact a cloud service that quorum witness module 284 may provide to the SPU 220 when a quorum of other available SPUs 220 in the cluster of storage platform 200 cannot be made.

FIG. 3 shows a flow diagram of a process 300 for setting up a cluster system that may use a cloud-based quorum witness service. Process 300 is described for the example of setting up cluster storage platform 200 of FIG. 2, but process 300 may be generalize for setup of other cluster systems. Setup process 300 may begin with a subprocess 310 where a user contacts a cloud-based management plane, and the user provides information to the cloud-based to identify the hardware in a cluster system being set up and to indicate requirements or preferences for configuration of the cluster system. For example, a user with access to enterprise facilities 240 may employ a client station 242 or server 210 to contact management infrastructure 280, identify platform 200 or SPUs 220, and provide requirements or preferences for the storage platform 200. The requirements or preferences may, for example, indicate how much mirrored or unmirrored storage is needed and identify the applications that may be using the storage services from storage platform 200. The identification information for storage platform 200 may provide serial numbers or addresses of SPUs 220 and may enable management infrastructure 280 to communicate with and configure SPUs 220.

The cloud-based management plane in a subprocess 320 configures nodes in the cluster system based on the user's requirements and preferences obtained in process block 310. For example, management infrastructure 280 implementing subprocess 320 may contact the SPUs 220 in storage platform 200 and instruct SPUs 220 to create virtual volumes 222, backup virtual volumes 224, and other LUNs 226, e.g., boot LUNs. The cloud-based management plane may also provide nodes in the cluster system with configuration data, e.g., a management address 252, indicating how or where to contact the cloud-based management plane for subsequent services, e.g., one or more of SPUs 220 may be configured to contact management infrastructure 280 when a quorum witness is needed.

A subprocess 330 determines whether the cluster system may need a quorum witness service. A quorum witness service may not be needed, for example, if the cluster system includes a quorum witness device or when the number of nodes in the cluster is high enough that a quorum of nodes would be available in all likely failure scenarios. A quorum witness service may only be need in a two-node cluster or a cluster in which one or more failures creates a two-node cluster. In the example of FIG. 2, the determination of whether a quorum witness service is need may be based on the number of SPUs 220 in storage platform 200. For a two-node cluster, for example, a quorum witness is needed (unless the cluster includes a quorum witness device). A subprocess 340 may initiate a quorum witness as a cloud service if the cluster system may need a quorum witness. In one example of the present disclosure, each SPU 220 in storage platform 200 decides whether the SPU 220 may need to use a quorum witness or not and makes quorum witness module 284 available. Subprocess 340 may not be required because the cloud-service, e.g., management infrastructure 280, may make the quorum service, e.g., service 284, always available in the cloud. Management infrastructure 280 may provide details of the number of nodes in the cluster of SPUs 220 that is being created, so that each SPU 220 can determine if the SPU 220 needs to make use of quorum witness service 284. Each SPU 220 may already have configuration data, e.g., an address 252, indicating where to contact management infrastructure 280 for administrative services and therefore may use the same configuration data to contact quorum witness service 284 since quorum witness service 284 may be implemented in or as a part of management infrastructure 280.

The quorum witness service 284 as a cloud service is accessible through public network 270, e.g., through the Internet. In a subprocess 350, the cloud-based management plane, i.e., management infrastructure 280, configures SPUs 220 with a management address 252, so that each SPU 220 can contact quorum witness module 284 when necessary. When an SPU 220, e.g., processing system 250, has identified that the quorum witness service 284 is required, the SPU 220 will initiate communication with the quorum witness module 284 and transfer status information.

FIG. 4 is a flow diagram of a process 400 during which a node in a cluster system may be required to make a decision based upon information from a cloud-service quorum witness. Process 400 may begin with a subprocess 410 in which a node determines that information from the quorum witness service is needed. For example, the node may not be able to see, i.e., communicate with, a quorum of the available nodes in the cluster, e.g., an SPU 220-1 cannot see half of the other available SPUs 220 in storage platform 200. At that point, the node in subprocess 420 attempts to request status information from the quorum witness cloud service and then in a subprocess 430 determines whether the request attempt failed. For example, an SPU 220 (in attempted request subprocess 420) may transmit a request to quorum witness service 484 and then (in decision subprocess 430) wait a set time to see whether quorum witness service 484 responds. If the attempted request succeeds, the quorum witness service in a subprocess 450 responds to the request by providing visibility information to the node sending the request. The visibility information may indicate which of the nodes in the quorum witness service can see and the last known status of the nodes. The node receiving the visibility information can then perform a subprocess 460 to determine an appropriate state for the node. For example, if the visibility information from the quorum witness indicates saw no other operating nodes are visible, the node may (to the extent possible) may take over functions of the missing node or nodes. If the visibility information indicates the quorum service can see a quorum of the nodes in the cluster, the node that is unable to see a quorum of nodes in the cluster may enter a failed state.

Any of SPUs 220-1 to 220-m in platform 200 of FIG. 2 may initiate process 400. For an example, SPU 220-1 may be unable to contact other SPUs 220 that with SPU 220-1 form a quorum of the storage nodes in storage platform 200. SPU 220-1 may then attempt to use its communication link 248 to send a request through networks 244 and 270 to quorum witness service 284. If quorum witness service 284 does not respond, SPU 220-1 assumes that SPU 220-1 has been isolated, and the SPU 220-1 enters a failed state 440. SPU 220-1 may remain in this failed state until the SPU 220-1 either again sees quorum witness service 284 or the other SPU 220. If quorum witness service 284 is available to SPU 220-1, quorum witness service 284 updates the other SPUs 220 upon their next request and responds to the request from SPU 220-1 with visibility information indicating which SPUs 220 quorum witness module 284 succeeded in contacting. SPU 220-1 may then use the visibility information to determine how to continue. For example, SPU 220-1 may take over storage services for virtual volumes 222 that belong to missing SPUs 220 and for which SPU 220-1 maintains a backup. If quorum witness service reports 284 availability of a quorum of SPUs 220, SPU 220-1 may assume that SPU 220-1 has lost communications with the other SPU or SPUs 220 and therefore enter a failed state.

A particularly important example of process 400 may be employed by a two-node cluster such as two-node cluster 510 in a system 500, which may have a failed state as shown in FIG. 5-1 or 5-2. Two-node cluster 510 of system 500 includes only a node A and a node B, and each node A or B is configured to contact quorum witness services 520. For purposes described further below, nodes A and node B may be assigned rankings such that one node A or B has a higher ranking than the other node. Nodes A and B may use the same algorithm to identify the higher-ranking node, so that nodes A and B will come to the same answer. In one example, nodes A and B have unique serial numbers, and the node A or B with the lowest serial number (when ordered alphabetically) has the highest rank. Cluster 510, which may be owned or operated by a user, has a communication system or link 512 through which node A and node B normally communicate to provide the functions, e.g., storage services, that cluster 510 provides to the user. Quorum witness service 530 may be implemented at a remote location or operated by an entity other than the user, and node A and node B communicate with quorum witness service 420 through a network 530 that includes a public network such as the Internet.

FIG. 5-1 illustrates a state of system 500 where node B has failed or where node B is unable to communicate with node A through cluster communication network 512 and unable to communicate with quorum witness 520 through network 530. Node A detects (in subprocess 410) that the communication with node B through system 512 has failed and attempts (in subprocess 420) to contact quorum service 520 through network 530. This communication succeeds and node A receives (in subprocess 450) visibility information indicating that quorum witness service 520 cannot see node B. Based on the visibility information, node A (in process block 460) takes over operations of node B, e.g., provides storage services to virtual volumes that node A was backing up for node B.

Node B in state of system 500 shown in FIG. 5-1 may detect (in subprocess 410) that the communication with node A through system 512 has failed. Node B may then attempt (in subprocess 420) to contact quorum service 520 through network 530. The communication between node B and quorum witness 520 fails, and based on the failure, node B enters a failed state.

FIG. 5-2 illustrates a state of system 500 where communications 512 between node A and node B has failed, but both node A and node B can communicate with quorum witness 520 through network 530. In this case, node A detects (in subprocess 410) that the communication with node B through system 512 has failed and attempts (in subprocess 420) to contact quorum service 520 through network 530. This communication succeeds and node A receives (in subprocess 450) visibility information indicating that quorum witness service 520 can see both nodes A and B. Similarly, node B detects (in its performance of subprocess 410) that the communication with node A through system 512 has failed and attempts (in its performance of subprocess 420) to contact quorum service 520 through network 530. This communication also succeeds, and node B receives (in subprocess 450) visibility information indicating that quorum witness service 520 can see both nodes A and B. Based on the visibility information, node A and node B (in their respective performance of process block 460) determine that communications 512 has failed, and the higher-ranking node A or B may take over for the lower ranking node B or A. The lower ranking node may enter a failed state.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process comprising:
identifying, by a management system, a first storage node and a second storage node of a cluster storage system;
automatically creating, by the management system, a quorum witness service as a cloud service in a management plane of the cluster storage system based on a number of storage nodes in the cluster storage system, wherein the quorum witness service has visibility to available storage nodes which are outside the management plane; and
configuring each of the first storage node and the second storage node to contact the quorum witness service when the first or the second storage node cannot contact a quorum of the available storage nodes in the cluster storage system.

2. The process of claim 1, further comprising:
configuring, by the management system, the first storage node and the second storage node to provide storage services of the cluster storage system.

3. The process of claim 2, further comprising:
configuring, by the management system, the first storage node to present one or more first virtual volumes for storage services from the cluster storage system; and
configuring, by the management system, the second storage node to maintain one or more first backup volumes that respectively copy the one or more first virtual volumes, wherein the first storage node and the second storage node communicate to maintain the first backup volumes as copies of the first virtual volumes.

4. The process of claim 3, further comprising:
configuring, by the management system, the second storage node to present one or more second virtual volumes for storage services from the cluster storage system; and
configuring, by the management system, the first storage node to maintain one or more second backup volumes that respectively copy the one or more second virtual volumes, wherein the first storage node and the second storage node communicate to maintain the second backup volumes as copies of the second virtual volumes.

5. The process of claim 3, further comprising:
attempting, by the second storage node, to contact the quorum witness service in response to the second storage node detecting a failure of communication with the first storage node, wherein the contact with the quorum witness service is attempted using a network system.

6. The process of claim 5, further comprising:
entering, by the second storage node, a failed state in response to the second storage node determining that the contact attempted has failed.

7. The process of claim 5, further comprising:
providing, by the quorum witness service, node visibility information to the second storage node in response to receiving a request from the second storage node;
indicating, using the node visibility information, which of the available storage nodes the quorum witness service can access; and
in response to the node visibility information indicating that the quorum witness service cannot access the first storage node, using, by the second storage node, the first backup volumes to present the first virtual volumes for the storage services that the storage cluster system provides.

8. The process of claim 7, further comprising:
in response to the node visibility information indicating that the quorum witness service can access the first storage node, determining, by the second storage node, whether the first storage node or the second storage node has priority;
in response to determining that the first storage node has priority, entering, by the second storage node, a failed state; and
in response to determining that the second storage node has priority, using, by the second storage node, the first backup volumes to present the first virtual volumes for the storage services from the storage cluster system.

9. The process of claim 1, wherein configuring each of the first and second storage nodes to contact the quorum witness service further comprises:
enabling the first storage node to communicate with the quorum witness service through a network system; and
enabling the second storage node to communicate with the quorum witness service through a same or a different network system.

10. The process of claim 9, further comprising:
configuring, by the management system, the first storage node and the second storage node to provide storage services of the cluster storage system.

11. A storage system comprising a processing unit configured to control backend storage to provide storage services in a cluster storage system, the processing unit comprising:
a first communication interface adapted for first communications with further processing units configured to provide storage services of one or more other nodes of the cluster storage system; and
a second communication interface adapted for second communications through a network, the second communications with a quorum witness service in a management plane and which has visibility to available storage nodes which are outside the management plane, the quorum witness service automatically created based on a number of the available storage nodes in the cluster storage system, the second communications in response to a failure of the first communications with the one or more other storage nodes through the first communication interface.

12. The storage system of claim 11, wherein the processing unit is further configured to transmit a request to a management system in the management plane and wherein the management system, in response to the request, configures a first one of the available storage nodes and a second one of the available storage nodes to provide storage services of the cluster storage system.

13. The storage system of claim 12, wherein the processing unit is further configured to transmit a request to a management system in the management plane and wherein the management system configures the first one of the available storage nodes to present one or more first virtual volumes for storage services from the cluster storage system, and configures for the second one of the available storage nodes to maintain one or more first backup volumes that respectively copy the one or more first virtual volumes, wherein the first one of the available storage nodes and the second one of the available storage nodes communicate to maintain the first backup volumes as copies of the first virtual volumes.

14. The storage system of claim 13, wherein the processing unit is further configured to transmit a request to a management system in the management plane and wherein the management system configures the first one of the available storage nodes to present one or more second virtual volumes for storage services from the cluster storage system, and configures the second one of the available storage nodes to maintain one or more second backup volumes that respectively copy the one or more second virtual volumes, wherein the first one of the available storage nodes and the second one of the available storage nodes communicate to maintain the one or more second backup volumes as copies of the second virtual volumes.

15. The storage system of claim 13, the second one of the available storage nodes is to attempt to contact the quorum witness service in response to the second one of the available storage nodes detecting a failure of communication with the first one of the available storage nodes, wherein the contact with the quorum witness service is to be attempted using a network system.

16. The storage system of claim 15, wherein the second one of the available storage nodes is to enter a failed state in response to the second one of the available storage nodes determining that the contact attempted has failed.

17. The storage system of claim 15, wherein:

the quorum witness service is to provide node visibility information to the second one of the available storage nodes in response to receiving the request from the second one of the available storage nodes;

the node visibility information is to indicate which of the available storage nodes the quorum witness service can access; and in response to the node visibility information indicating that the quorum witness service cannot access the first one of the available storage nodes, the second one of the available storage nodes to use the first backup volumes to present the first virtual volumes for the storage services from the storage cluster system.

18. The storage system of claim 17, wherein:

in response to the node visibility information indicating that the quorum witness service can access the first one of the available storage nodes, the second one of the available storage nodes is to determine whether the first one of the available storage nodes or the second one of the available storage nodes has priority;

in response to determining that the first one of the storage nodes has priority, the second one of the available storage nodes is to enter a failed state; and in response to determining that the second one of the available storage nodes has priority, the second one of the available storage nodes is to use the first backup volumes to present the first virtual volumes for the storage services from the storage cluster system.

19. The storage system of claim 11, wherein a first one of the available storage nodes is to communicate with the quorum witness service through a network system, and wherein a second one of the available storage nodes is to communicate with the quorum witness service through the same or a different network system.

20. The storage system of claim 19, wherein a management system of the management plane is to configure the first one of the available storage nodes and the second one of the available storage nodes to provide storage services of the cluster storage system.

* * * * *